(12) United States Patent
Wang et al.

(10) Patent No.: US 10,261,579 B2
(45) Date of Patent: Apr. 16, 2019

(54) HEAD-MOUNTED DISPLAY APPARATUS

(71) Applicant: Samsung Electronics Co., Ltd., Gyeonggi-do (KR)

(72) Inventors: Sangjin Wang, Gyeonggi-do (KR); Donghyeon Kim, Gyeonggi-do (KR); Youngjin Yi, Gyeonggi-do (KR); Jongchul Choi, Gyeonggi-so (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 113 days.

(21) Appl. No.: 14/832,249

(22) Filed: Aug. 21, 2015

(65) Prior Publication Data

US 2016/0062454 A1    Mar. 3, 2016

(30) Foreign Application Priority Data

Sep. 1, 2014  (KR) .......................... 10-2014-0115311
Jan. 21, 2015  (KR) .......................... 10-2015-0009837
Jan. 22, 2015  (KR) .................. 20-2015-0000531 U

(51) Int. Cl.
*H04N 5/232*    (2006.01)
*G02B 7/28*    (2006.01)
(Continued)

(52) U.S. Cl.
CPC ............. *G06F 3/012* (2013.01); *G02B 7/023* (2013.01); *G02B 27/0172* (2013.01); *G02B 27/0176* (2013.01); *G02B 27/022* (2013.01); *G02B 27/2228* (2013.01); *G06F 1/163* (2013.01); *G06F 3/047* (2013.01); *G06T 19/006* (2013.01); *G09G 5/003* (2013.01); *H04N 13/344* (2018.05);
(Continued)

(58) Field of Classification Search
CPC .............................. H04N 5/23212; G02B 7/28
See application file for complete search history.

(56) References Cited

U.S. PATENT DOCUMENTS 1,230,705 A  6/1917  Hales
5,488,510 A  1/1996  LeMay
(Continued)

FOREIGN PATENT DOCUMENTS

CN    2724027 Y    9/2005
CN    101477250 A    7/2009
(Continued)

OTHER PUBLICATIONS

European Search Report dated May 18, 2016.
Korean Notice of Allowance dated Jun. 8, 2016.
Chinese Search Report dated Dec. 11, 2018.

*Primary Examiner* — Matthew Salvucci
(74) *Attorney, Agent, or Firm* — Cha + Reiter, LLC.

(57) ABSTRACT

A head-mounted display apparatus may include: a main frame, one surface of which faces a user's face; and a support part coupled to at least part of the main frame to fix the main frame to the user's face, wherein the main frame has a cavity structure such that an electronic device is mounted on an opposite surface thereof and includes a position adjustment part for adjusting the position of an electronic device, and a structure for preventing the electronic device from being tilted during the position adjustment is included in the interior of the main frame.

14 Claims, 18 Drawing Sheets

(51) Int. Cl.
*G06F 3/01* (2006.01)
*G02B 27/02* (2006.01)
*G02B 27/22* (2018.01)
*G02B 27/01* (2006.01)
*G02B 7/02* (2006.01)
*G06F 1/16* (2006.01)
*G06F 3/047* (2006.01)
*G06T 19/00* (2011.01)
*G09G 5/00* (2006.01)
*H04N 13/344* (2018.01)

(52) U.S. Cl.
CPC ........ *G02B 7/28* (2013.01); *G02B 2027/0132* (2013.01); *G02B 2027/0178* (2013.01); *G09G 2300/04* (2013.01); *H04N 5/23212* (2013.01); *H04N 2213/001* (2013.01)

(56) References Cited

U.S. PATENT DOCUMENTS

| | | | |
|---|---|---|---|
| 5,880,773 A | 3/1999 | Suzuki | |
| 2002/0154278 A1* | 10/2002 | Masuda | G02B 7/02 353/101 |
| 2008/0239523 A1 | 10/2008 | Beck et al. | |
| 2010/0079356 A1* | 4/2010 | Hoellwarth | G02B 27/017 345/8 |
| 2010/0289725 A1 | 11/2010 | Levine | |
| 2013/0128364 A1 | 5/2013 | Wheeler et al. | |
| 2013/0194682 A1 | 8/2013 | Sahu | |
| 2014/0362445 A1 | 12/2014 | Welker | |
| 2015/0042543 A1* | 2/2015 | Kim | G02B 27/017 345/8 |

FOREIGN PATENT DOCUMENTS

| | | |
|---|---|---|
| CN | 103970275 A | 8/2014 |
| CN | 203773162 U | 8/2014 |
| CN | 204331156 U | 5/2015 |
| DE | 20 2013 102 458 U1 | 7/2013 |
| EP | 0 551 781 A1 | 7/1993 |
| GB | 2499102 A | 8/2013 |
| JP | 7-318850 A | 12/1995 |
| JP | 2007-318850 A | 12/2007 |
| KR | 10-2014-0013676 A | 2/2014 |
| WO | 96/07947 A1 | 3/1996 |
| WO | 02/056091 A1 | 7/2002 |
| WO | 2014/108693 A1 | 7/2014 |

* cited by examiner

FIG. 11
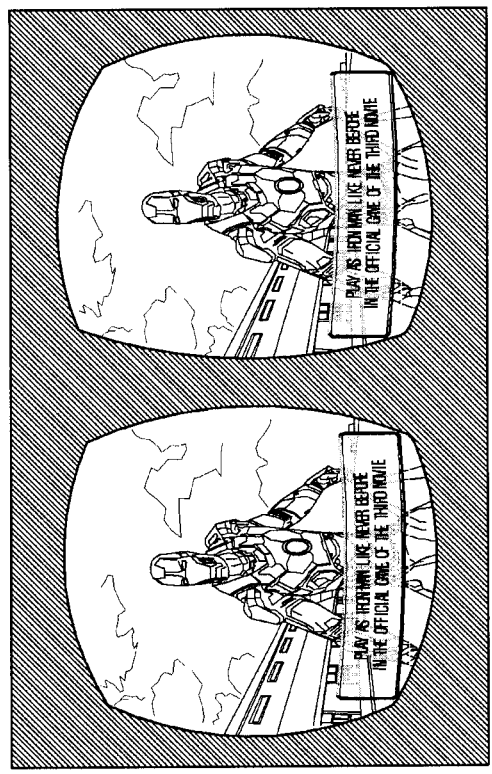
HMM mode (Stereoscopic)
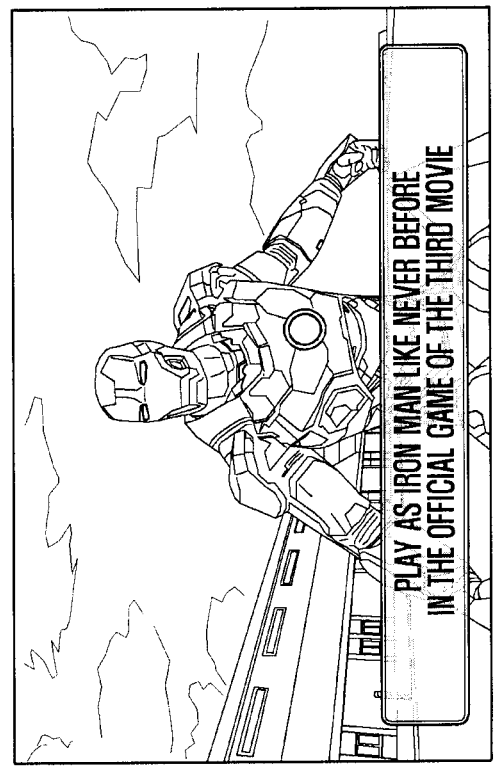
Normal mode (Monoscopic)

FIG. 12
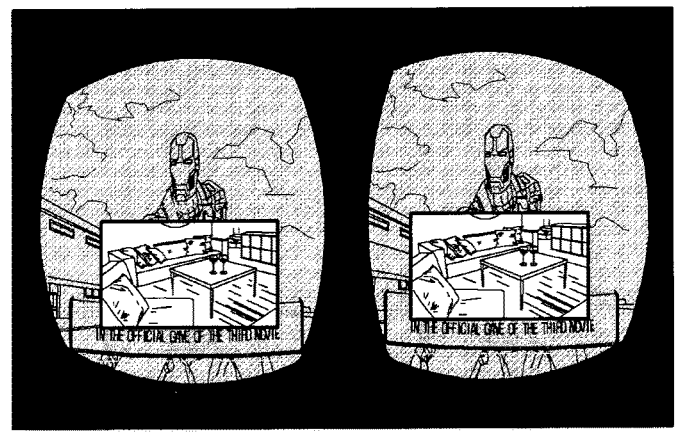
PIP mode
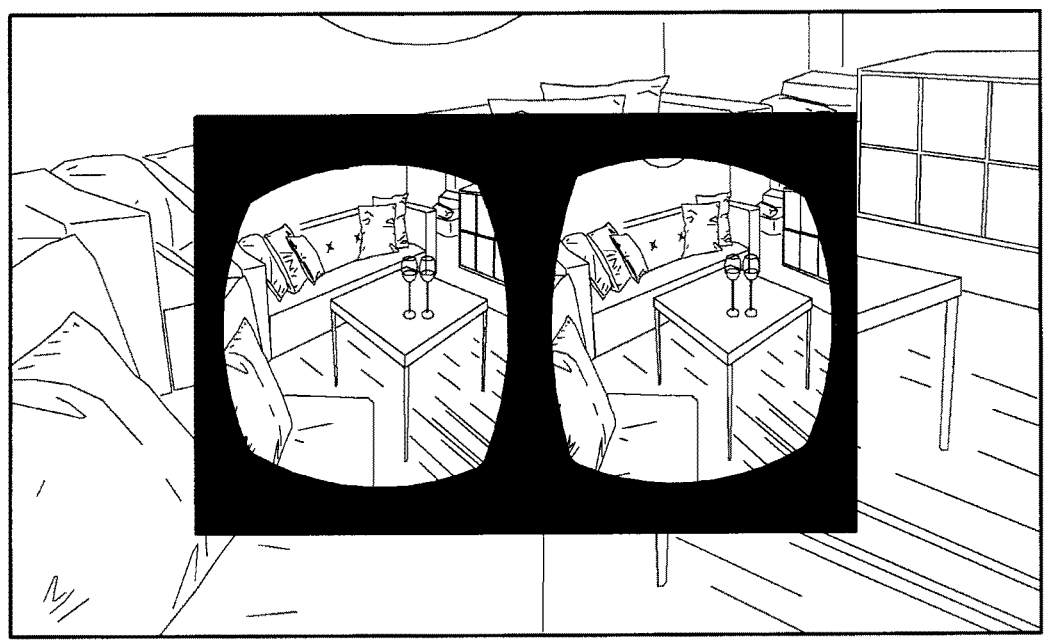
See-throught mode

FIG. 15
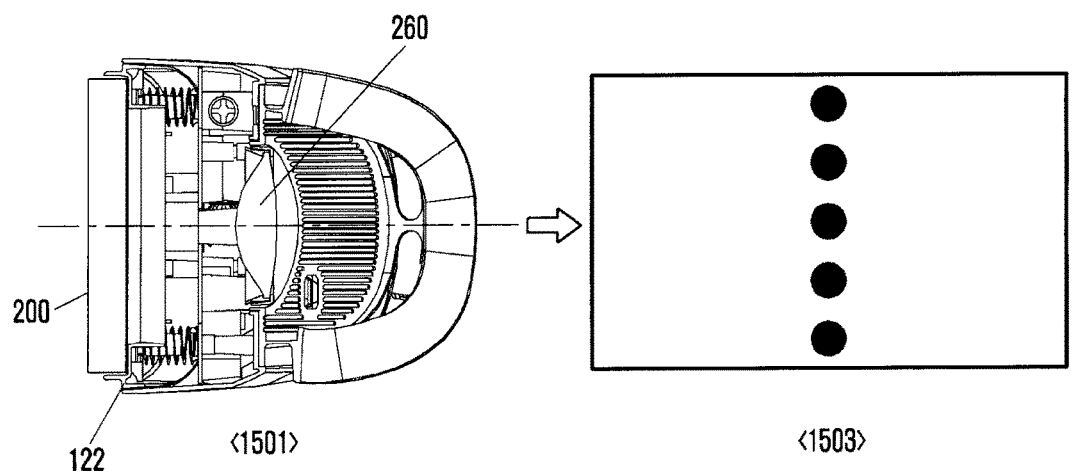
<1501>  <1503>
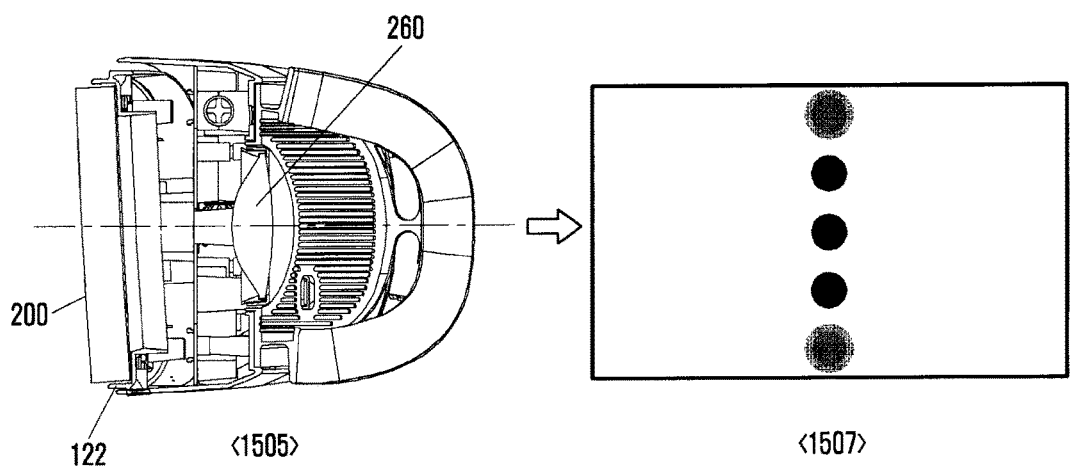
<1505>  <1507>

HEAD-MOUNTED DISPLAY APPARATUS

CLAIM OF PRIORITY

This application claims priority under 35 U.S.C. § 119(a) to Korean Patent Application Serial Nos. 10-2014-0115311, 10-2015-0009837 and Korean Utility Application No. 20-2015-0000531, which were filed in the Korean Intellectual Property Office on Sep. 1, 2014, Jan. 21, 2015 and Jan. 22, 2015, respectively, the entire contents of each of which are hereby incorporated by reference.

BACKGROUND

1. Technical Field

The present disclosure generally relates to a head-mounted display apparatus.

2. Description of the Related Art

In recent years, various types of electronic devices that can be directly worn on users' body parts have been developed. Such devices are generally called wearable devices.

Examples of wearable electronic devices that are worn on user body parts may include head-mounted display (HMD) apparatuses which are worn on a user's head to display images. Other examples of wearable electronic devices may include smart glasses, smart watches, wristbands, contact lens type devices, ring type devices, shoes type devices, clothing type devices, glove type devices, and the like. Such wearable electronic devices may have various forms that can be attached to or detached from users' body parts or clothes. For example, HMD apparatuses may have a goggles or glasses shape. Since wearable electronic devices are directly worn on users' body parts, they are relatively portable and accessible by the users as compared to devices that are not worn on the users' body parts.

However, there is a continuing need for new and improved wearable devices that will be even more portable, accessible, and comfortable while providing ever greater functionality.

SUMMARY

A head-mounted display (HMD) apparatus, according to various embodiments of the present disclosure, is equipped with a portable mobile communication terminal that is used as a display. In so doing, the inconvenience of having to separately carry the terminal is solved. For example, the display of the head-mounted display apparatus can output an image at a location opposite to a user's eyes, and a lens located between the user and the display can correct the user's visual acuity.

The head-mounted display (HMD) apparatus, according to various embodiments of the present disclosure, provides a structure for preventing shaking or tilting when adjusting the distance between the lens and the display.

A head-mounted display (HMD) apparatus, according to various embodiments of the present disclosure may include: a main frame, one surface of which faces a user's face; and a support part coupled to at least part of the main frame to fix the main frame to the user's face. The main frame may have a cavity structure and an electronic device may be mounted on an opposite surface thereof, and may include a position adjustment part for adjusting the position of the external electronic device. A structure for preventing the external electronic device from being tilted during the position adjustment may be included in the interior of the main frame.

According to various embodiments of the present disclosure, the head-mounted display (HMD) apparatus can prevent shaking or tilting of a display when moving the display, thereby providing comfortable or steady images to a user.

These and other aspects of the present disclosure will be more fully described hereinbelow with reference to the accompanying drawings.

BRIEF DESCRIPTION OF THE DRAWINGS

The above features and advantages of the present disclosure will be more apparent from the following detailed description in conjunction with the accompanying drawings, in which:

FIG. 11 is a diagram for explaining a normal mode and a head-mounted mode (HMM) or a VR mode of the head-mounted display apparatus, according to various embodiments of the present disclosure;

FIG. 12 is a diagram illustrating an example in which a head-mounted display apparatus provides a see-through mode using a rear camera of a smart phone according to various embodiments of the present disclosure;

FIG. 15 illustrates examples of a screen for detecting tilting of the head-mounted display apparatus and displaying a user interface according to various embodiments of the present disclosure.

DETAILED DESCRIPTION

Figure 1:
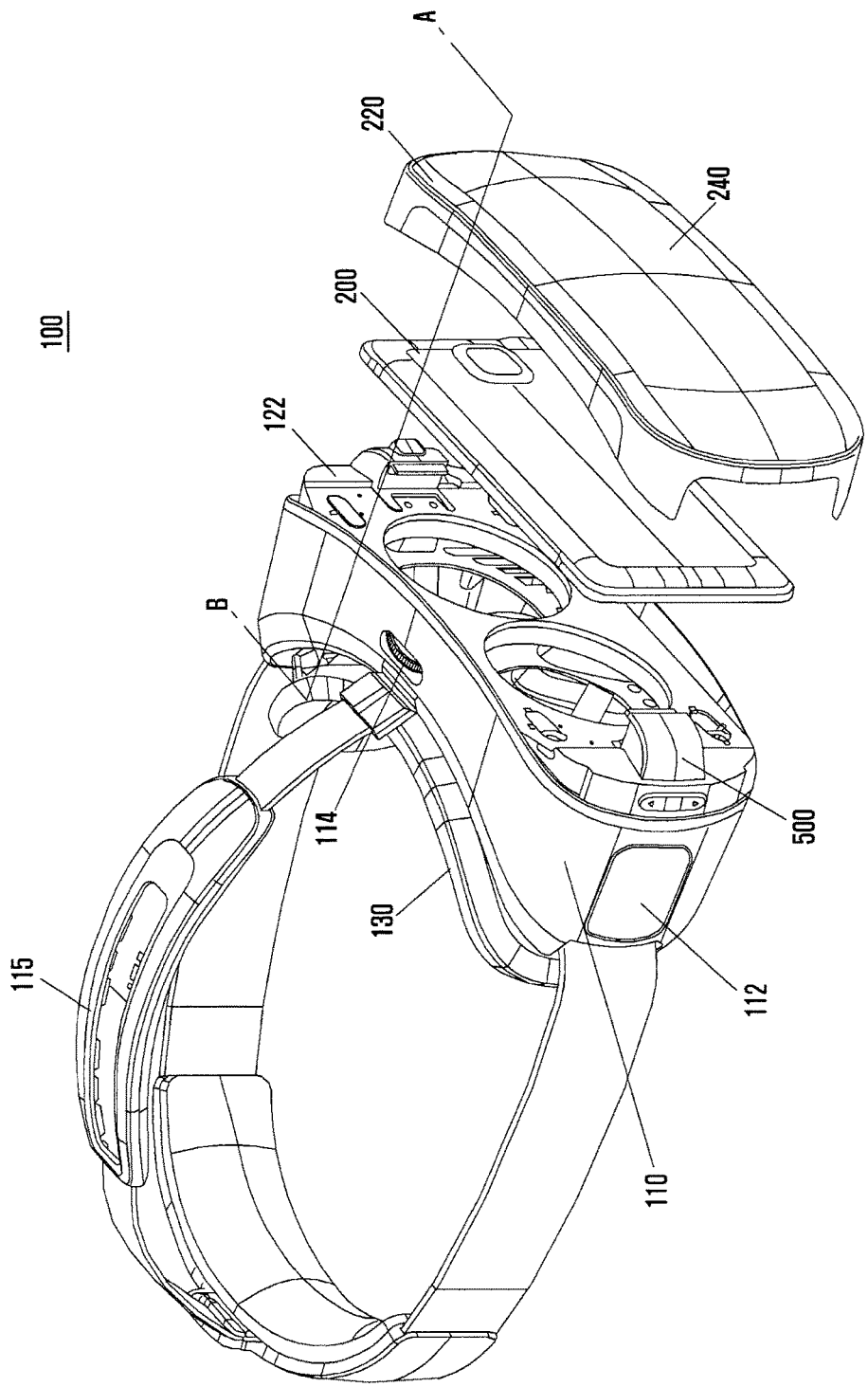
FIG. 1 is a perspective view illustrating the configuration of a head-mounted display apparatus according to various embodiments of the present disclosure shown separated from an electronic device and a cover.

Hereinafter, various embodiments will be described in detail with reference to the accompanying drawings. It should be noted that the same or like elements will be designated by the same or like reference numerals although they are shown in different drawings. Further, a detailed description of a known function and configuration which may make the subject matter of the present disclosure unclear will be omitted. Hereinafter, it should be noted that only the descriptions will be provided that may help understanding the operations provided in association with the various embodiments of the present disclosure, and other descriptions will be omitted to avoid making the subject matter of the present disclosure rather unclear.

A head-mounted display apparatus, according to the various embodiments of the present disclosure, may provide at least one of a see-through function for providing augmented reality (AR) through a display and a see-closed function for providing virtual reality (VR) through a display.

Taking GOOGLE GLASS for example, the see-through function may generally refer to a function of transferring actual images of external objects to a user's eyeballs through the display or through a transparent/translucent lens and offering the objects or virtual targets or objects to the user using a visual means or various other sensory means.

By the see-through function, the user may be provided with additional information and/or images of objects that are actually visible to his/her eyes.

In another embodiment, the user may also be provided with additional information by using a hologram, etc. instead of the display or the lens.

Taking SONY HMZ for example, the see-closed function is provided by separate displays; two displays are disposed in front of a user's eyeballs, and the user can view content (games, movies, streaming, broadcasts, etc.) provided through the displays. This may provide a sense of immersion to the user using independent screens.

Accordingly, the head-mounted display (HMD) apparatus of the present disclosure may be differentiated from the existing head-mounted display devices.

A head-mounted display device 100, which may include a communication function, may include a main frame or face plate 110 to which an electronic device 200 may be attached or detached.

The electronic device 200 may include, for example, at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical appliance, a camera, and a wearable device (e.g., a head-mounted device (HMD) such as electronic glasses, electronic clothes, an electronic bracelet, an electronic necklace, an electronic accessory, electronic tattoos, or a smart watch).

Figure 2:
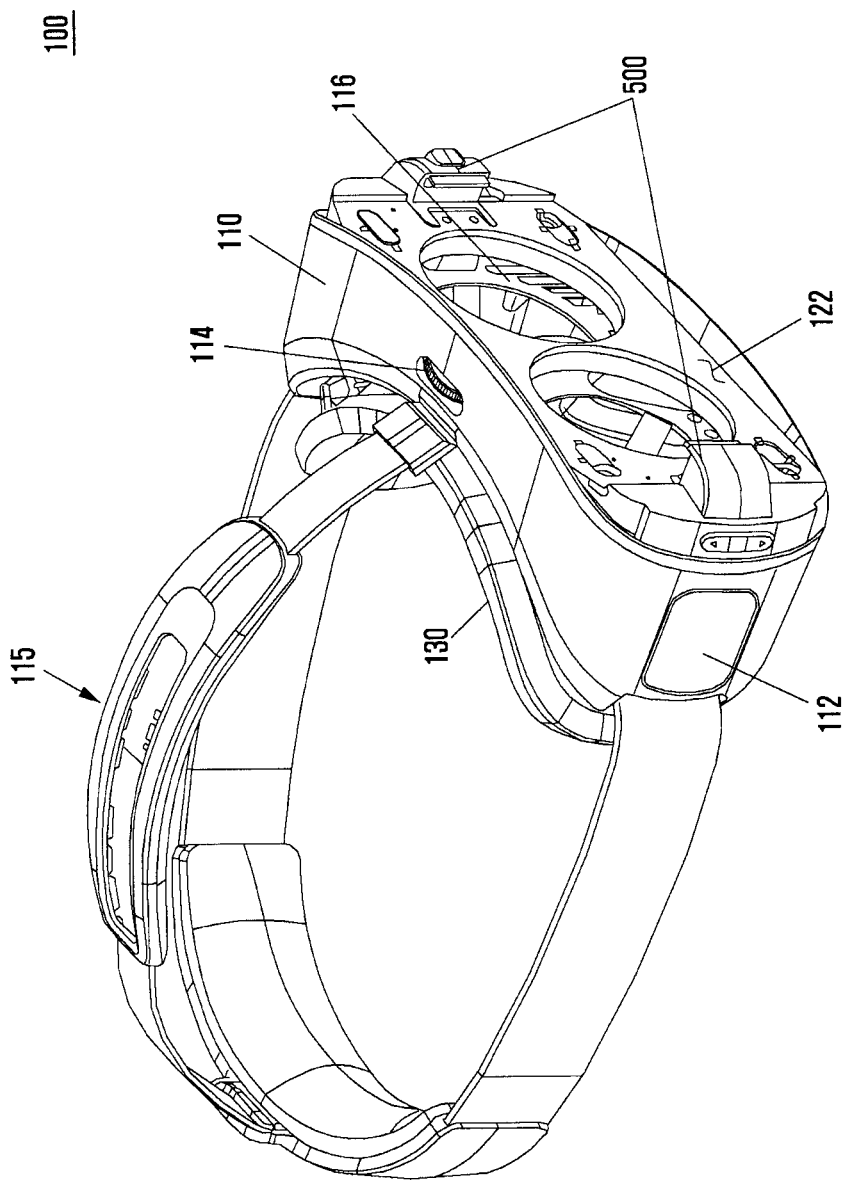
FIG. 2 is a perspective view of a main frame in a state in which the head-mounted display apparatus of FIG. 1 is not coupled to the electronic device and the cover.
Figure 3:
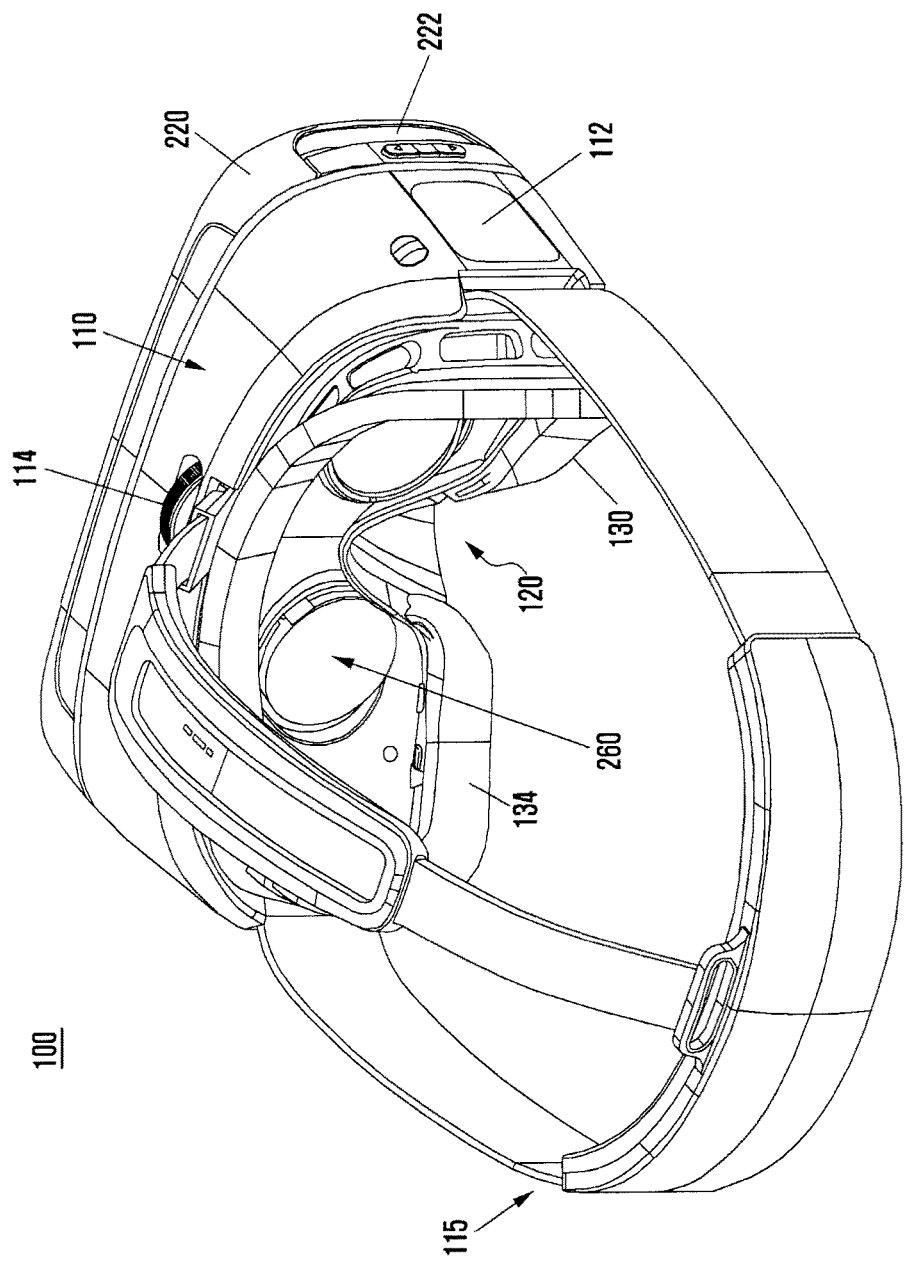
FIG. 3 is a rear perspective view of the head-mounted display apparatus to which the electronic device and the cover are mounted.
Figure 4:
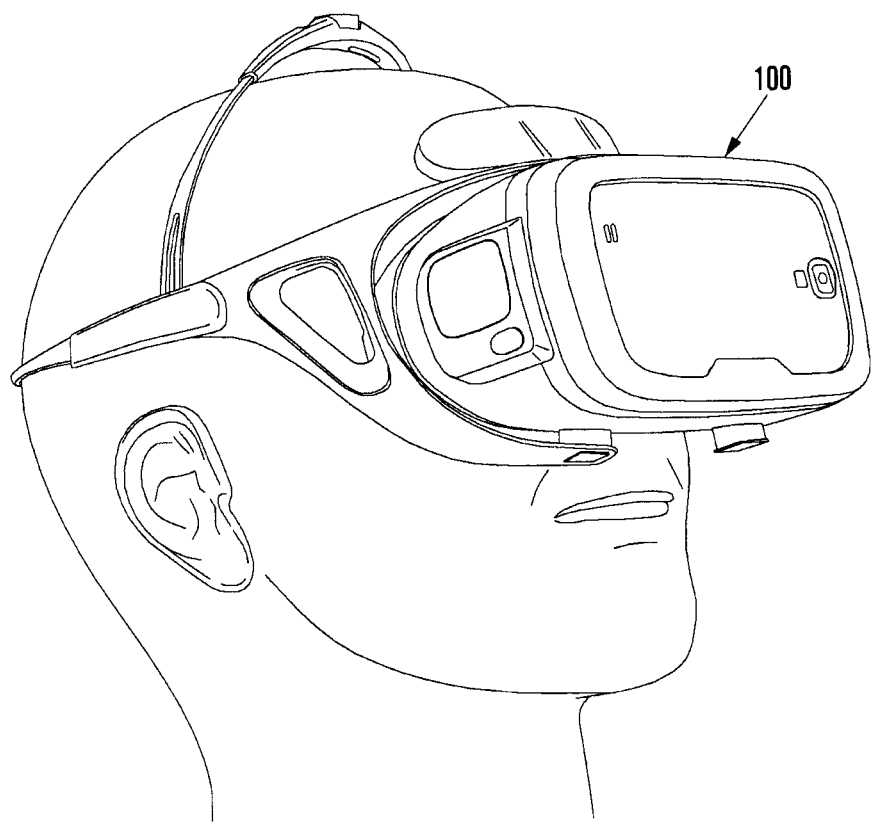
FIG. 4 is a diagram illustrating a state in which a user wears the head-mounted display apparatus of FIG. 1.

FIG. 1 illustrates the configuration of the HMD apparatus 100 according to the various embodiments of the present disclosure shown relative to the electronic device 200 and a cover 220. FIG. 2 illustrates a state in which the HMD apparatus 100 of FIG. 1 is not coupled with the electronic device 200 and in which the cover is not mounted to the HMD apparatus. FIG. 3 is a rear perspective view of the HMD apparatus to which the electronic device 200 and a cover 220 are mounted. FIG. 4 illustrates a state in which a user wears the head-mounted display apparatus 100 of FIG. 2.

Referring to FIGS. 1 to 4, the HMD apparatus 100, according to the various embodiments of the present disclosure, may include a main frame 110 and a support part 115 (e.g., a goggle band).

The main frame or face plate 110 may be worn on at least part of the user's face (e.g., the user's facial side) and may be supported on the user's facial side through various elements.

In an embodiment, the support part 115 may facilitate bringing the face plate 110 close to the skin around the user's eyes by adjusting the length of a band formed of a resilient material. Cushions may be attached to the band in order to provide a comfortable fit, which may be advantageous considering that the user may wear the HMD apparatus for a long period of time.

Additionally, or alternatively, the support part 115 may include an eyeglass temple, a helmet, a strap, etc.

The rear surface of the main frame 110 may include a facial-side contact part 130 that contacts the user's facial side, and may have a structure corresponding to the flexion of the user's facial side and may include at least part of a resilient body 134.

The resilient body 134 may be made of at least one cushion material, such as, for example, a sponge, in order to provide a comfortable fit when the facial-side contact part 130 is brought into contact with the user's facial side. The resilient body 134 may be constituted with a single sponge, or may have a shape in which one or more sponges having different compressibility are stacked on each other. For example, the resilient body 134 may be a sponge having a plurality of layers (e.g., three layers that may include an upper layer, an intervening layer, and a lower layer) stacked one on top of the other in which the upper and lower layers may be made of a sponge having a lower compressibility, and the intervening layer may be made of a sponge having a higher compressibility.

According to another embodiment, the resilient body 134 may be detachably coupled to the main frame 110. The resilient body 134 may have an adhesive member on one surface thereof, and may be attached to or detached from the main frame 110 via the adhesive member. The adhesive member may include, for example, but is not limited to a Velcro tape, an adhesive, etc., and any detachable adhesive member may be used as the adhesive member. Accordingly, in cases where several users (e.g., adults and children having different facial contours) use a single HMD apparatus 100, each user can use a resilient body suitable for him/her, and in cases where the surface of the resilient body 134 is contaminated (for example, by cosmetics for women), or where the resilient body 134 is damaged due to the frequent use thereof, the resilient body 134 can be replaced and the HMD apparatus 100 can be used again.

Accordingly, the HMD apparatus 100 of the present disclosure can be easily worn on the user's facial side. For example, the main frame 110 may have a shape or structure for covering the user's eyes and may include a nose recess 120 where the user's nose is located.

A lens assembly including at least one lens may be inserted into a portion of the facial-side contact part 130 that faces the user's eyes.

At least one surface of the lens may be exposed to the facial-side contact part 130 such that the user can view the screen of the display apparatus with his/her eyes when wearing the HMD apparatus 100 of the present disclosure.

The main frame 110 may be formed of a material, for example plastic, which is light enough for the user to perceive wearing comfort and can support the electronic device 200.

The main frame 110 may further contain a material for protecting the HMD apparatus 100 of the present disclosure.

In another embodiment, the protective material may include at least one of various materials that provide strength and/or beauty. For example, the material may include at least one of the following: glass, plastic (e.g., ABS, polycarbonate, etc.), ceramics, metal (e.g., aluminum), and/or metal alloy (e.g., steel, stainless steel, titanium, or magnesium alloy).

The main frame 110 may include a touchpad 112, a display position adjustment part 114, and a lens fixing part 116, and a front case 122 having a space or structure where the external electronic device 200 may be coupled may be formed on the front side of the main frame 110.

The main frame 110 may further include a connector to communicate with the external electronic device 200 coupled thereto.

In an embodiment, the connector may include a USB connector which may be connected to an electric connection part, for example, a USB port of the external electronic device 200, and a signal of a graphical user interface, which will be described below, may be provided to the external electronic device 200 through an electric connection part of the USB connector.

The front case 122 of the main frame 110 may correspond to the external appearance of the external electronic device 200.

In an embodiment, the front case 122 may be formed of a resilient material or a flexible material and may be deformed to accommodate the external electronic device 200 having various sizes.

The HMD apparatus 100, according to the various embodiments of the present disclosure, may further include the cover 220 which may be coupled to the main frame 110 to more firmly support a terminal of the external electronic device 200 while the terminal may be fastened to the main frame 110.

The cover 220 may be coupled to the main frame 110 via a physical structure such as a hook, or via a magnet or an electromagnet.

The cover 220 may additionally prevent the terminal from being separated from the main frame 110, and may enhance an aesthetic impression while forming the external appearance of the main frame 110.

The cover 220 may further include a window 240 on the front side thereof, and the window 240 serves to enhance an aesthetic impression through various types of materials and colors thereof.

The window 240 may be manufactured of a typical plastic material such as, for example, PC or acrylic resin, glass, sapphire, a ceramic material such as transparent ceramics, or a metal material such as aluminum, SUS, etc. A transparent material may have a chromatic color, the transparency of which may be controlled.

The cover 220 may further include one or more openings 222. The heat generated from the terminal may be easily discharged to the outside of the cover 220 through the openings 222, thereby decreasing the temperature of the terminal, and thus preventing the degradation in the performance of the terminal.

The weight of the cover 220 may be reduced by having one or more openings 222 formed in the cover 220, which makes it possible to decrease the total weight of the HMD apparatus, resulting in the weight reduction of the HMD apparatus.

one or more displays (not shown) or a transparent/translucent lens 260 may be integrally or detachably fixed to the lens fixing part 116 of the main frame 110.

In an embodiment, a lens assembly including the transparent/translucent lens 260 may be inserted between the one or more displays and the user's eyes.

A soft material (e.g., a sponge, a rubber, etc.) may be provided on the rear surface of the main frame 110 to prevent the main frame 110 from being excessively brought close to the skin around the user's eyes.

In an embodiment, the main frame 110 may include a control device or a user input module 112 capable of controlling the external electronic device 200.

The control device 112 may include, for example, at least one of the touchpad, a physical key, a physical button, a touch key, a joystick, and a wheel key on the side of the main frame 110.

In this embodiment, the control device 112 may display a graphical user interface (GUI) capable of controlling the functions of the electronic device 200. For example, a GUI for setting sounds may control the volume of audio output from the external electronic device 200, and a GUI for reproducing videos may control videos displayed on the external electronic device 200.

The control device 112 may receive the user's touch input (e.g., a direct touch or a hovering input on the control device 112).

Since the HMD apparatus 100 of the present disclosure is connected to the external electronic device 200 using an interface such as a USB, etc., the HMD apparatus 100 may transmit the received touch input to the external electronic device 200.

The external electronic device 200 may control the function corresponding to the touch input received from the HMD apparatus 100 in response to the received touch input. For example, the external electronic device 200 may adjust a volume, or may control the reproduction of a video in response to the received touch input.

According to an embodiment, the display position adjustment part 114 may include a wheel or a dial.

When the display position adjustment part 114 is configured in the form of a wheel or a dial, the user may turn the wheel or the dial implemented for the position adjustment part 114, the external electronic device 200 is moved so that the distance between the display of the external electronic device 200 and the user may be adjusted, and as a result, the user can adjust the position of the external electronic device 200 to watch a video suitable for his/her visual acuity or an optimally displayed video.

Meanwhile, the front case 122 of the main frame 110 may include fastening parts 500 for fixing the external electronic device 200 when coupled to the front case 122.

Figure 5:
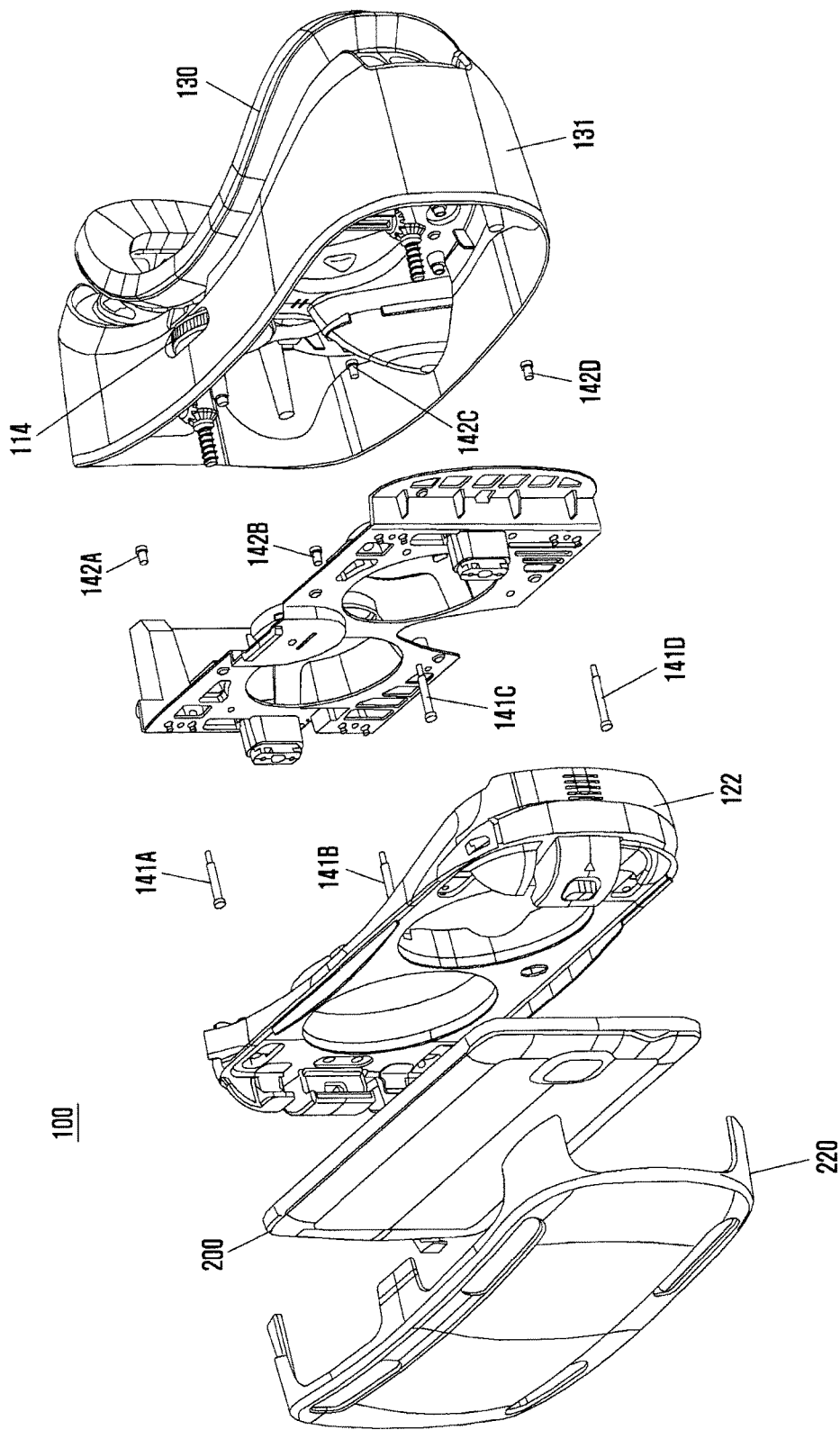
FIG. 5 is an exploded perspective view of the main frame of the head-mounted display apparatus according to the various embodiments of the present disclosure.
Figure 6:
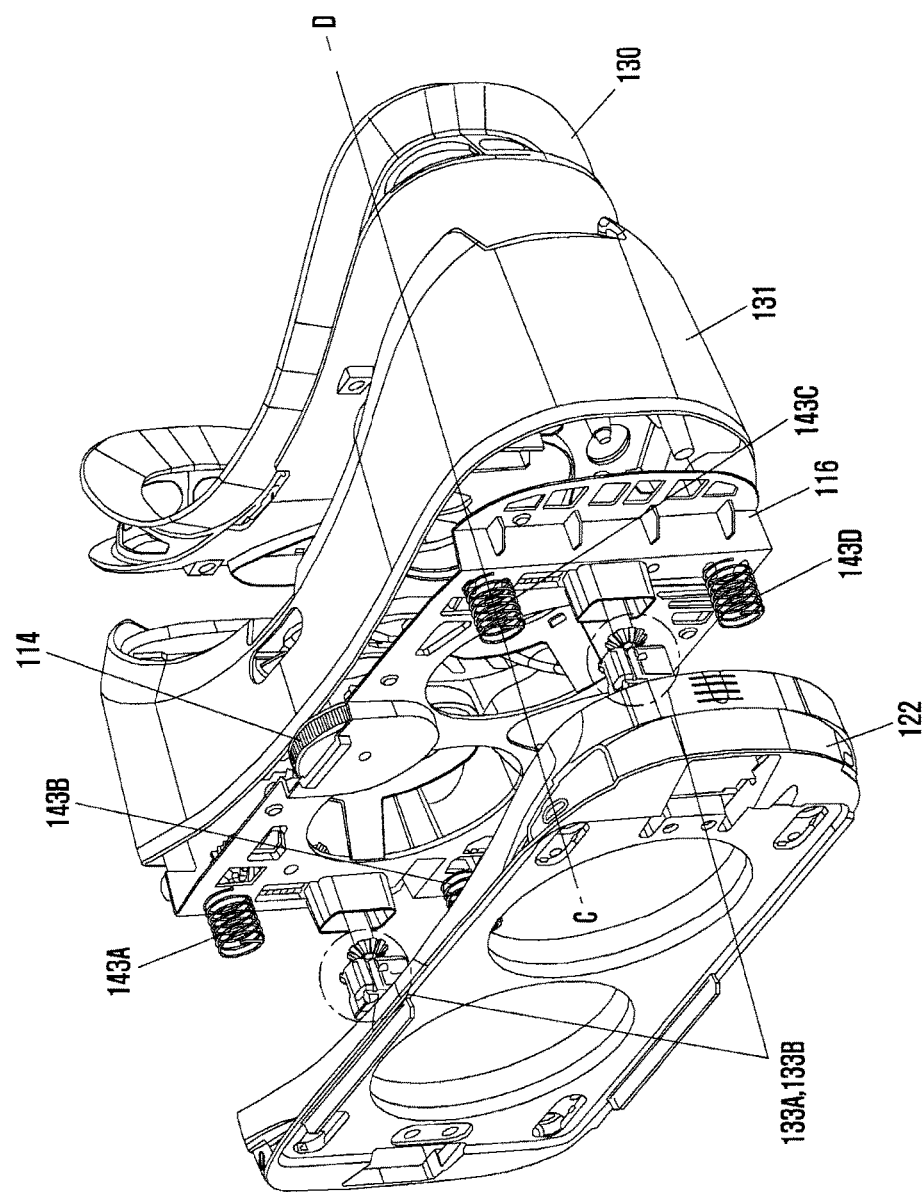
FIG. 6 is an exploded perspective view of the main frame of the head-mounted display apparatus according to the various embodiments of the present disclosure.

FIGS. 5 and 6 are exploded perspective views of the main frame 110 of the head-mounted display apparatus 100 according to the various embodiments of the present disclosure.

In FIG. 5, the main frame 110 may include the front case 122, the lens fixing part 116, the facial-side contact part 130, a rear case 131, one or more lens moving rails 141A, 141B, 141C, 141D, one or more lens moving rail fixing parts 142A, 142B, 142C, 142D, or the cover 220.

The electronic device 200 may be fixed between the front case 122 and the cover 220. The front case 122 may include a fixing part for supporting the cover 220 and a fixing part for fixing the electronic device 200. For example, the front case 122 may further include the fastening parts 500 of FIG. 1 and may fix the electronic device 200 via the fastening parts 500.

When the position adjustment part 114 is operated to move the electronic device 200, the front case 122 moves along the one or more lens moving rails 141A, 141B, 141C, 141D while the electronic device 200 is fixed thereto. For example, through the operation of the position adjustment part 114, the front case 122 may move away from or close to the user's eyes while the electronic device 200 is fixed thereto.

The facial-side contact part 130 may be mounted on one surface of the rear case 132. The facial-side contact part 130, where the HMD apparatus 100 and the user's body part make direct contact with each other, may be formed of a cushion material in order to provide comfortable fit. At least one surface of the lens may be exposed to the facial-side contact part 130 such that the user can view the screen of the display apparatus with his/her eyes when wearing the HMD apparatus 100.

A portion of the position adjustment part 114 may be exposed to the outside through the upper central portion of the rear case 131. At least one position adjustment part 114 may be installed and may be constituted in the form of a wheel or a dial. The user may turn the wheel or the dial implemented for the position adjustment part 114 in order to adjust the position of the display. The position where the position adjustment part 114 is disposed may be diversely adjusted in consideration of the characteristic of the HMD apparatus 100.

In an embodiment, the HMD apparatus 100 may fix lenses and may adjust the distance between the electronic device 200 and the user by moving the electronic device 200 supported thereby through the position adjustment part 114. The user may adjust the position of the electronic device 200 to watch a video suitable for his/her own visual acuity by adjusting the position of the display of the electronic device 200 through the position adjustment part 114.

In an embodiment, when the user operates the position adjustment part 114, the HMD apparatus 100 may move the electronic device 200 away from or close to the user.

In an embodiment, the front case 122 constituting the main frame 110 may move according to the manipulation of the position adjustment part 114. In this case, the rear case 131 may provide a space where the front case 122 can move, and may provide a guide through which the front case 122 can move.

The display or the transparent/translucent lens 260 may be detachably fixed to the lens fixing part 116. The lens fixing part 116 may be disposed between the front case 122 and the rear case 131.

The one or more lens moving rails 141A, 141B, 141C, 141D may be disposed on four corners of the front case 122, the lens fixing part 116, and the rear case 131 and may be fixed to the rear case 131 through the one or more lens moving rail fixing parts 142A, 142B, 142C, 142D. The one or more lens moving rails 141A, 141B, 141C, 141D fixed to the rear case 131 may be fixed to the front case 122 while passing through the lens fixing part 116.

In FIG. 6, the lens fixing part 116 may be coupled with one or more resilient members 143A, 143B, 143C, 143D.

In cases where the one or more resilient members 143A, 143B, 143C, 143D have a hollow structure, the one or more lens moving rails 141A, 141B, 141C, 141D may be disposed in the interior of the one or more resilient members 143A, 143B, 143C, 143D, respectively. For example, the one or more resilient members 143A, 143B, 143C, 143D may be springs that each have a resilience. The one or more lens moving rails 141A, 141B, 141C, 141D may be disposed in the interior of the springs, respectively. In cases where the one or more resilient members 143A, 143B, 143C, 143D are springs having resilience, the resilient members may include various forms of available springs, such as coil springs, plate springs, hydraulic springs, etc., and may also be replaced by various materials having resilience, such as rubber, sponge, etc., other than springs.

The one or more resilient members 143A, 143B, 143C, 143D may prevent shaking or tilting of the front case 122 by providing resilience to the front case 122 when the front case 122 moves along the one or more lens moving rails 141A, 141B, 141C, 141D by the position adjustment part 114.

When the position adjustment part 114 is operated, female and male screws included in one or more moving gears 133A, 133B are loosened or tightened to thereby move the front case 122. For example, the male screw loosening direction may correspond to a direction in which the front case 122 moves toward the lens 260 or the user, and the male screw tightening direction may correspond to a direction in which the front case 122 moves away from the lens 260 or the user. In another embodiment, the male screw tightening direction may correspond to a direction in which the front case 122 moves toward the lens 260 or the user, and the male screw loosening direction may correspond to a direction in which the front case 122 moves away from the lens 260 or the user.

Figure 7A:
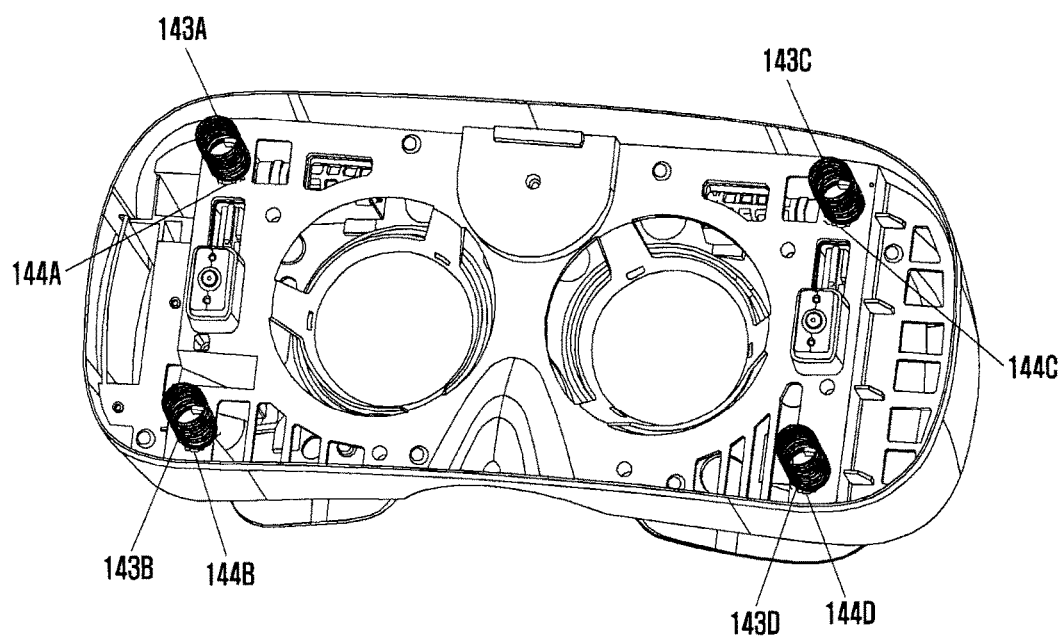
FIG. 7A, FIG. 7B and FIG. 7C are structural views and a sectional view of the head-mounted display apparatus from which the front case is removed according to the various embodiments of the present disclosure.
Figure 7B:
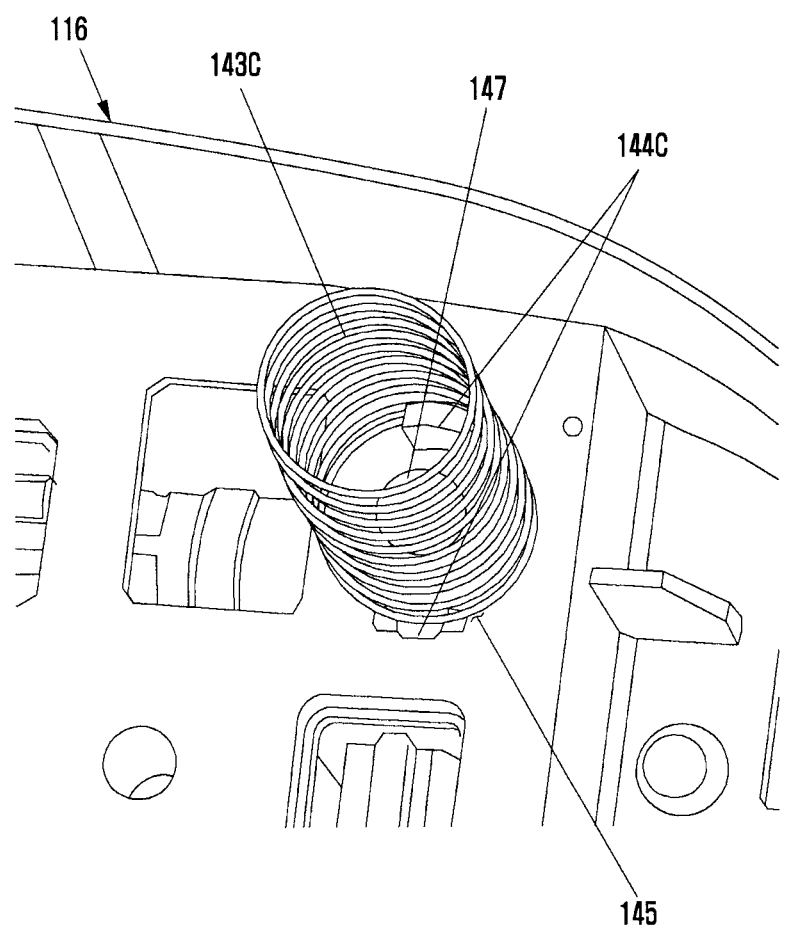
Figure 7C:
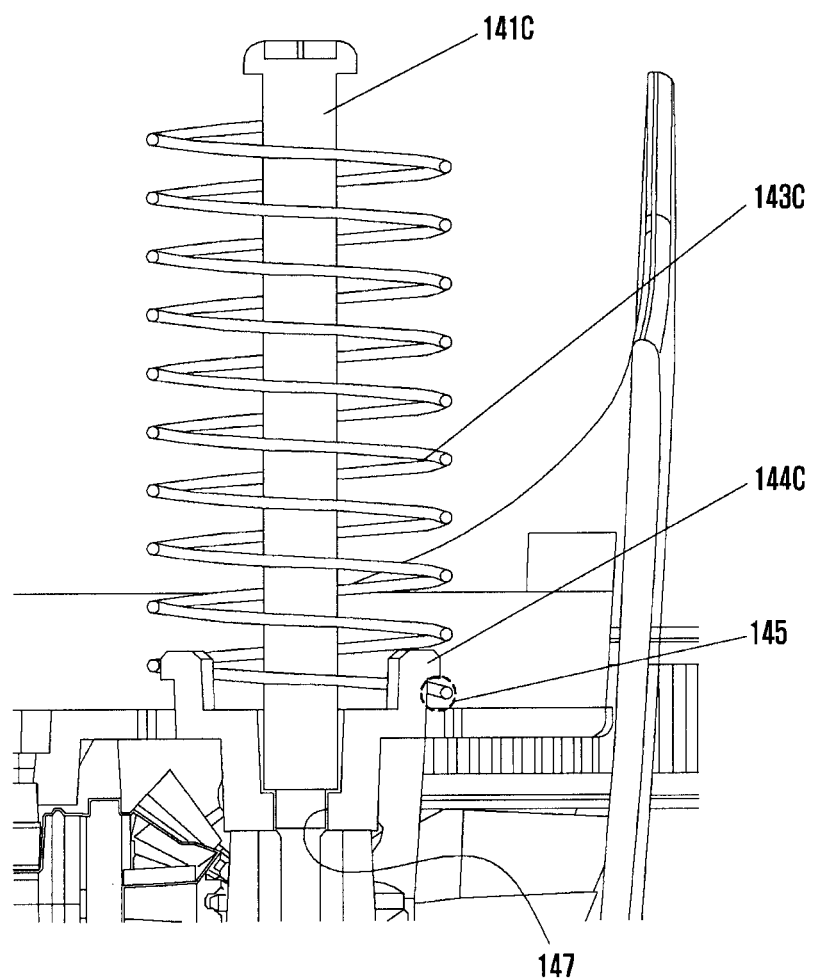

FIGS. 7A to 7C are structural views and a sectional view of the head-mounted display apparatus 100 from which the front case is removed according to the various embodiments of the present disclosure.

In FIG. 7A, the one or more resilient members 143A, 143B, 143C, 143D may be fixed to the lens fixing part 116. The lens fixing part 116 may include one or more fixing members 144A, 144B, 144C, 144D for fixing the one or more resilient members 143A, 143B, 143C, 143D. The one or more fixing members 144A, 144B, 144C, 144D may be separately inserted into the lens fixing part 116, or may be formed on the lens fixing part 116 when the lens fixing part 116 is subjected to injection-molding.

The one or more fixing members 144A, 144B, 144C, 144D may be located on the four corners of the lens fixing part 116 where the one or more resilient members 143A, 143B, 143C, 143D and the one or more lens moving rails 141A, 141B, 141C, 141D are positioned.

The one or more fixing members 144A, 144B, 144C, 144D may include recesses 147 (or holes) into which the lens moving rails 141A, 141B, 141C, 141D are inserted and hooks for fixing the resilient members 143A, 143B, 143C, 143D, respectively. The directions of the hooks may correspond to the direction of the front case 122.

In FIG. 7B, the hooks of the fixing members 144A, 144B, 144C, 144D may have recesses 145 into which the resilient members 143A, 143B, 143C, 143D are fitted, and may prevent the separation of the resilient members 143A, 143B, 143C, 143D.

In FIG. 7C, the hooks of the fixing members 144A, 144B, 144C, 144D fix the resilient members 143A, 143B, 143C, 143D. The lens moving rails 141A, 141B, 141C, 141D may be inserted into the recesses 147 (or holes) of the fixing members 144A, 144B, 144C, 144D.

Figure 8:
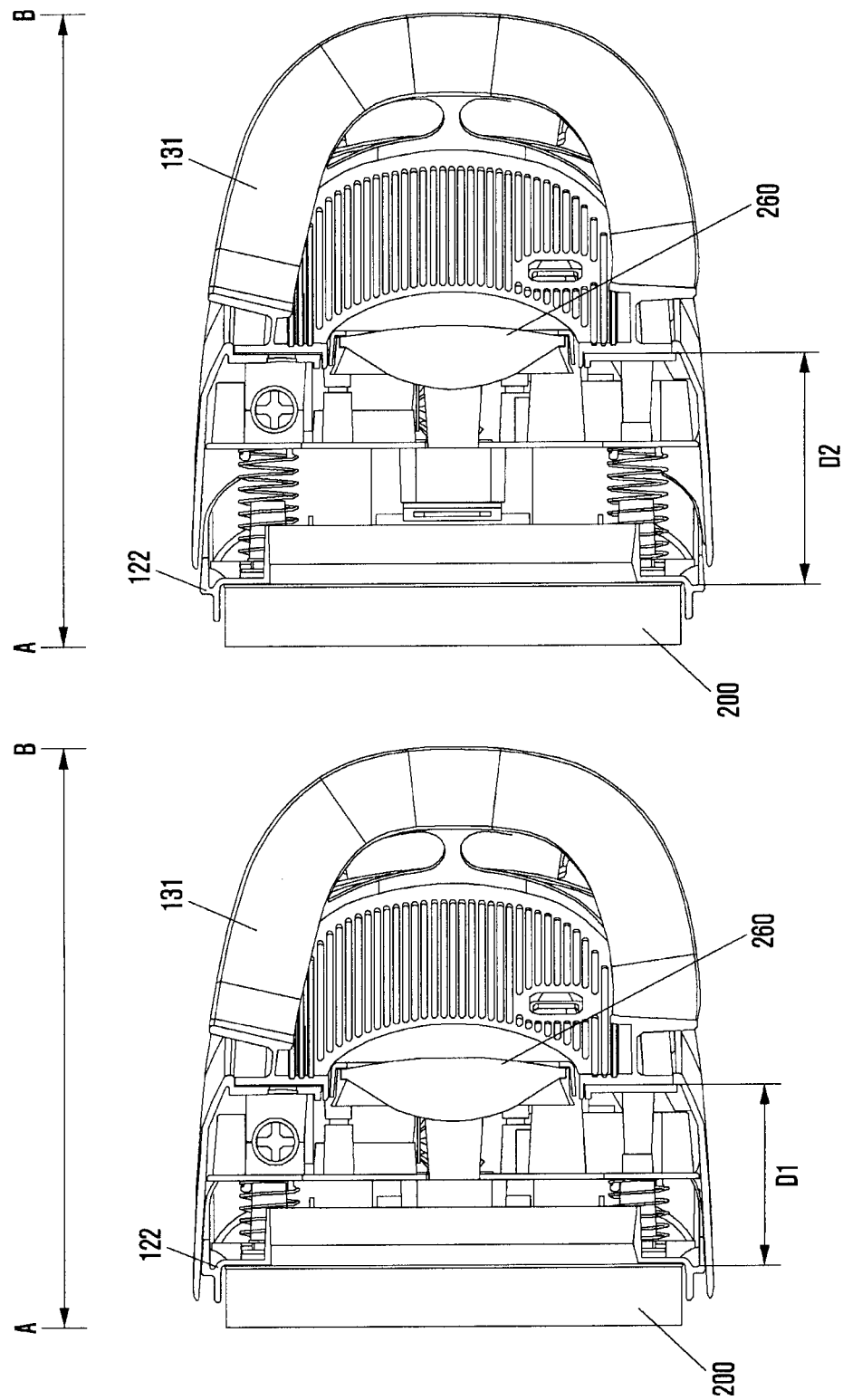
FIG. 8 is a sectional view of the head-mounted display apparatus of FIG. 1, which is taken along the A-B direction.

FIG. 8 is a sectional view of the head-mounted display apparatus 100 of FIG. 1, which is taken along the A-B direction.

Through the operation of the position adjustment part 114, the female and male screws included in the moving gears 133A, 133B are loosened or tightened to thereby move the front case 122.

In this case, as the front case 122 moves toward the lens 260 or the user, the electronic device 200 and the lens 260 may become closer to each other up to a first distance (D1). In contrast, as the front case 122 moves away from the lens 260 or the user, the electronic device 200 and the lens 260 may move away from each other up to a second distance (D2). The front case 122 may move between the first distance (D1) and the second distance (D2) from the lens 260. For example, the first distance (D1) may be 39 mm, and the second distance (D2) may be 47 mm. For example, the index of refraction of the lens 260 may be −9 diopters at the first distance (D1) and +0.5 diopters at the second distance (D2). The HMD apparatus 100 may provide the user with the refractive index of the lens 260 between −9 and +0.5 diopters.

Figure 9:
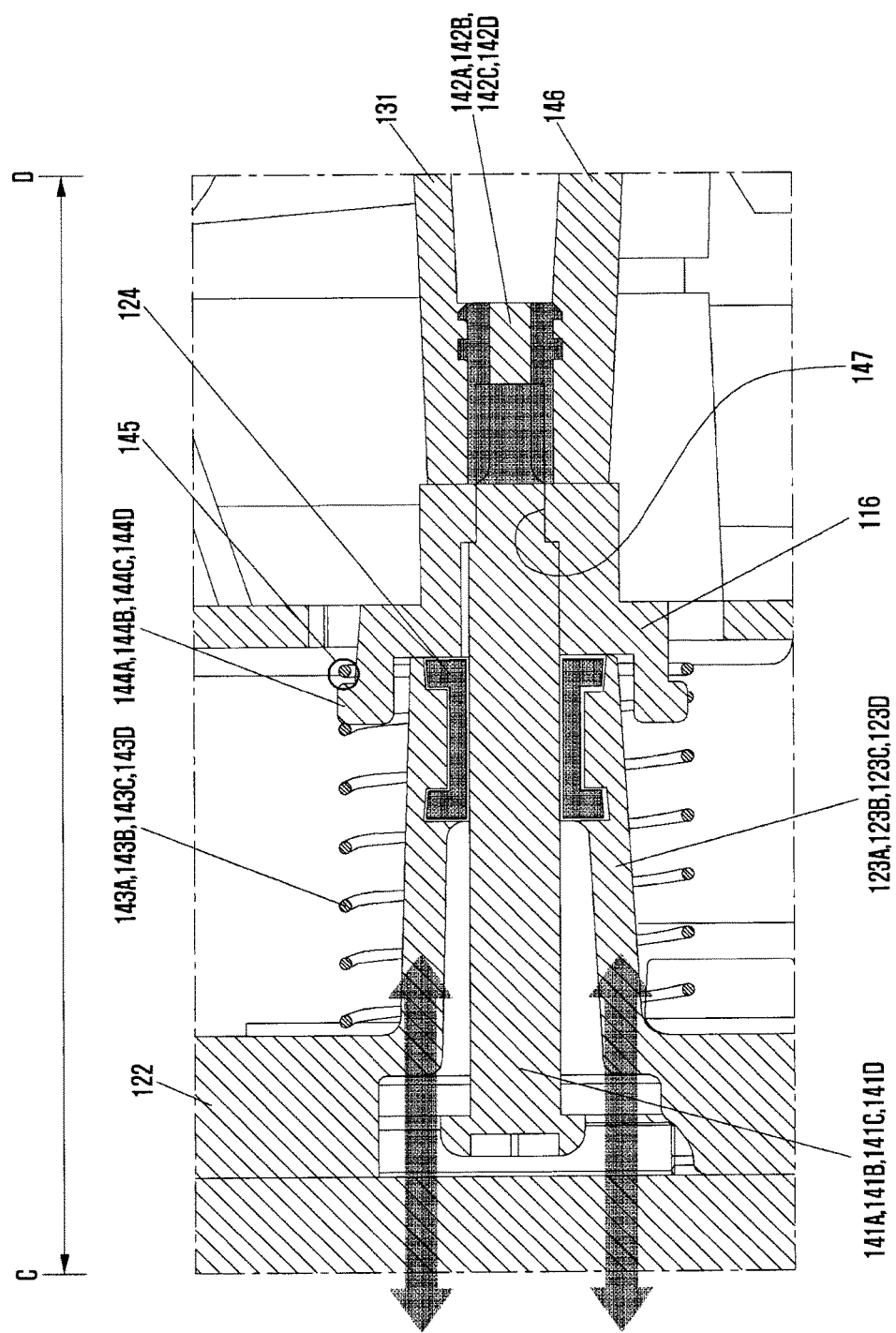
FIG. 9 is a sectional view of the head-mounted display apparatus of FIG. 6, which is taken along the C-D direction.

FIG. 9 is a sectional view of the head-mounted display apparatus 100 of FIG. 6, which is taken along the C-D direction.

The front case 122 may include one or more coupling cylinders 123A, 123B, 123C, 123D, into which the lens moving rails 141A, 141B, 141C, 141D are inserted, on the four corners thereof with which the lens moving rails 141A, 141B, 141C, 141D or the resilient members 143A, 143B, 143C, 143D make contact. The one or more coupling cylinders 123A, 123B, 123C, 123D may further include a bush 124, and may function to guide the lens moving rails 141A, 141B, 141C, 141D when the lens moving rails move. The resilient members 143A, 143B, 143C, 143D may be mounted on the one or more coupling cylinders 123A, 123B, 123C, 123D, and thus the separation of the resilient members 143A, 143B, 143C, 143D can be prevented. When the user moves the front case 122, the bushes located in the interior of the front case 122 may move along the surfaces of the lens moving rails 141A, 141B, 141C, 141D. Each of the lens moving rails 141A, 141B, 141C, 141D may have a thread formed on one end thereof (similar to that of a screw), and the lens moving rails may be fixedly coupled to the one or more lens moving rail fixing parts 142A, 142B, 142C, 142D, which may be located in the interior of the rear case 131, via the threads. Additionally, steps 146 may be formed on the distal ends of the threads to fix the lens fixing part 116 located between the lens moving rails 141A, 141B, 141C, 141D and the rear case 131.

With decreasing distances between the bushes and the lens moving rails 141A, 141B, 141C, 141D, the amount of movement thereof may gradually decrease, but it may be difficult to assemble them due to the tolerance of dimension between the components. In contrast, with increasing distances between the bushes and the lens moving rails 141A, 141B, 141C, 141D, it may be easy to assemble them, but the amount of movement thereof may increase. Accordingly, the distance between the two components may be, for example, about 0.03 to 0.05 mm in consideration of the amount of movement and the tolerance of dimension. The bushes may be made of metal, or may be made of a material having a high dimensional accuracy, other than metal. Likewise, the lens moving rails 141A, 141B, 141C, 141D may also be made of metal, or may also be made of material having a high dimensional accuracy, other than metal.

Figure 10:
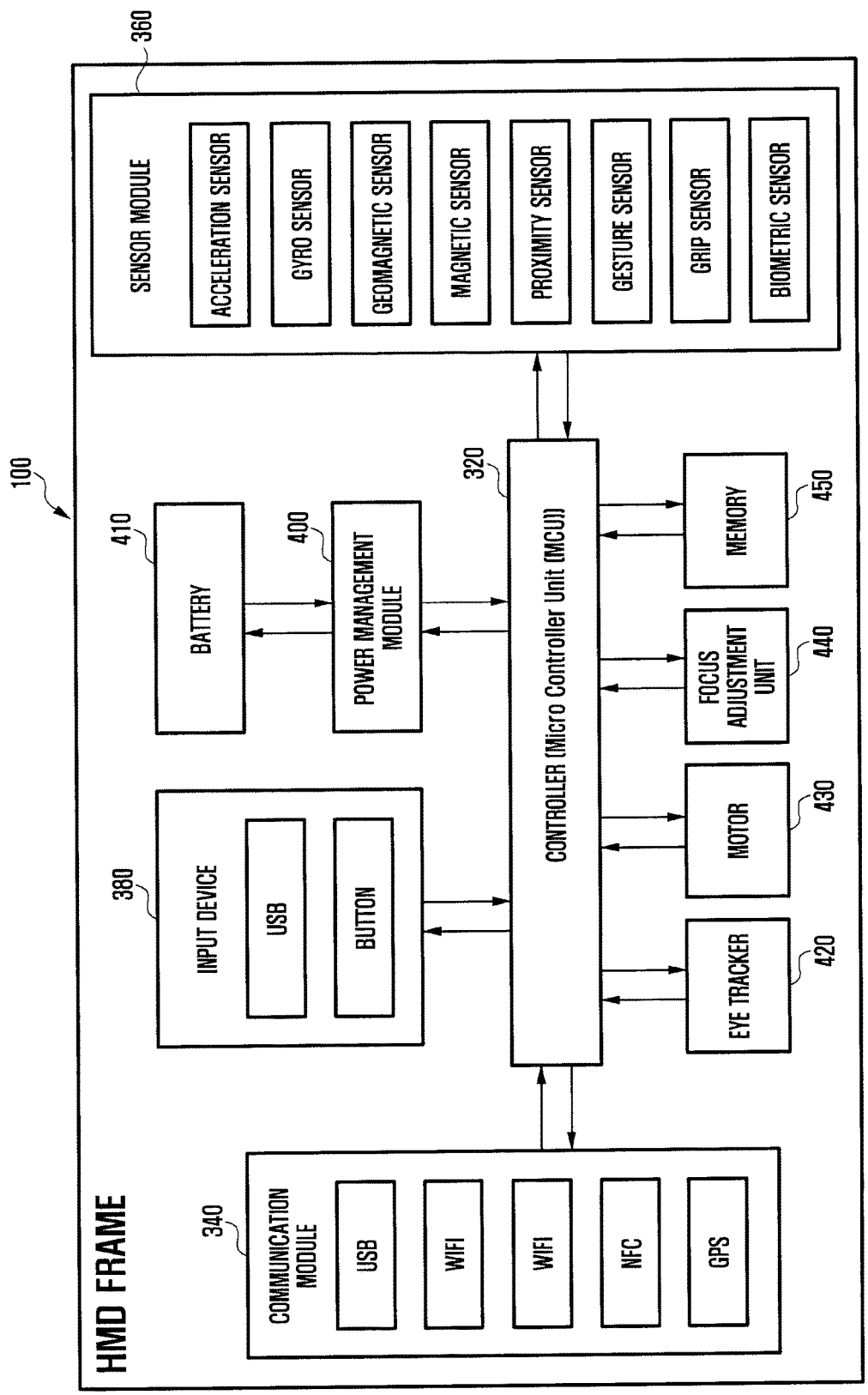
FIG. 10 is a schematic block diagram illustrating the configuration of a head-mounted display apparatus according to various embodiments of the present disclosure.

FIG. 10 is a schematic block diagram illustrating the configuration of a head-mounted display apparatus 100 according to various embodiments of the present disclosure.

Referring to FIG. 10, the HMD apparatus 100, according to the various embodiments of the present disclosure, may include a controller 320 (a micro controller unit (MCU)), a communication module 340, a sensor module 360, an input device 380, a power management module 400, a battery 410, an eye tracker 420, a motor 430 (vibrator), a focus adjustment unit 440 (adjustable optics) or a lens assembly, and a memory 450.

Other elements (e.g., a display) are not illustrated in the block diagram for convenience of description.

In another embodiment, some of the elements illustrated in the block diagram may be included in the main frame 110, and the other elements may be included in the display device (e.g., a detachable smart phone) of the external electronic device 200.

The controller (MCU) 320 may include, for example, one or more processors, and may control a plurality of hardware elements connected thereto by driving an operating system (OS) or embedded S/W programs.

The communication module 340 may electrically connect the main frame 110 of the HMD apparatus 100 of the present disclosure and the external electronic device 200, for example, a smart phone terminal using wired and/or wireless communication to perform data transmission/reception.

According to an embodiment, the communication module 340 may include a USB module, a Wi-Fi module, a BT module, an NFC module, and a GPS module.

According to another embodiment, at least one or at least some (i.e., two or more) of the Wi-Fi module, the BT module, the GPS module, and the NFC module may be included in a single Integrated Chip (IC) or IC package.

The sensor module 360 may measure a physical quantity or detect the operating state of the HMD apparatus to convert the measured or detected information into an electric signal. The sensor module 360 may include, for example, at least one of an acceleration sensor, a gyro sensor, a geomagnetic sensor, a magnetic sensor, a proximity sensor, a gesture sensor, a grip sensor, and a biometric sensor.

The acceleration sensor, the gyro sensor, and the geomagnetic sensor may detect the motion of a user's head on which the HMD apparatus 100 is worn.

The proximity sensor or the grip sensor may detect whether the user wears the HMT apparatus 100.

In an embodiment, at least some elements of the sensor module 360 may be included in the detachable electronic device 200 (e.g., a smart phone).

According to an embodiment, whether the user wears the HMT apparatus may be detected by sensing at least one of IR recognition, pressurization recognition, and a change in capacitance (or dielectric constant) according to the user's wearing of the HMD apparatus.

The gesture sensor may detect the motion of the user's hand or finger to receive an input for the HMD apparatus 100 of the present disclosure.

Additionally or alternatively, the sensor module 360 may recognize the user's biometric information using a biometric sensor such as, for example, an E-nose sensor, an electromyography (EMG) sensor, an electroencephalogram (EEG) sensor, an electrocardiogram (ECG) sensor, an iris sensor, etc.

The sensor module 360 may further include a control circuit for controlling one or more sensors included therein.

The input device 380 may include a touchpad 112 and buttons. The touchpad 112 may recognize a touch input using at least one of, for example, a capacitive type, a resistive type, an infrared type, and an acoustic wave type. In addition, the touchpad 112 may further include a control circuit. In the case of the capacitive type, physical contact or proximity recognition is possible. The touchpad may further include a tactile layer. In this case, the touchpad 112 may provide a tactile reaction to the user, and the buttons may include, for example, physical buttons, optical buttons, a keypad, or the like.

The eye tracker 420 may track the user's line of sight using at least one of, for example, electrical oculography (EOG) sensors, coil systems, dual purkinje systems, bright pupil systems, and dark pupil systems. In addition, the eye tracker 420 may further include a micro camera for tracking a line of sight. The focus adjustment unit 440 (adjustable optics) may measure the user's inter-pupil distance (IPD) to adjust the distance of a lens and the position of a display of the electronic device 200 such that the user may view videos suitable for his/her visual acuity.

The memory 450 may include an internal memory or an external memory. For example, the internal memory may include at least one of a volatile memory (e.g., a dynamic random access memory (DRAM), a static RAM (SRAM), a synchronous dynamic RAM (SDRAM), etc.) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, etc.). According to an embodiment, the internal memory may be a solid state drive (SSD). The external memory may further include a flash drive, for example, a compact flash (CF), a secure digital (SD), a micro secure digital (Micro-SD), a mini secure digital (Mini-SD), an extreme digital (xD), a memory stick, etc. The external memory may be functionally connected to the HMD apparatus 100 through various interfaces. According to an embodiment, the HMD apparatus 100 may further include a storage device (or a storage medium) such as, for example, a hard disc drive, a flashdrive, or the like.

The memory 450 may store instructions or data generated from the controller 320, the communication module 340, the input device 380, and the sensor module 360. The memory 450 may include programming modules, such as a kernel, middleware, an application programming interface (API), and applications.

The kernel may control or manage system resources (e.g., the controller 320 or the memory 450) which are used to execute operations or functions implemented in the programming modules (e.g., the middleware, the API, and the applications) other than the kernel.

The kernel may provide an interface allowing the middleware, the API, or the applications to access individual elements of the HMD apparatus 100 and control or manage the elements.

The middleware may function as an intermediary allowing the API or the applications to communicate with the kernel and exchange data with the kernel. Regarding to task requests received from the applications, the middleware may perform a control (or scheduling or load balancing) on the task requests by assigning priorities for using the system resources (e.g., the controller 320 or the memory 450) of the head-mounted display apparatus 100 to at least one of the applications.

The API is an interface allowing the applications to control functions provided by the kernel or the middleware. For example, the API may include at least one interface or function (e.g., instruction) for file control, window control, image processing, text control, etc.

The applications may include a short message service (SMS)/multimedia message service (MMS) application, an e-mail application, a calendar application, an alarm application, a health care application (e.g., an application for measuring an amount of exercise or blood sugar), and an environmental information application (e.g., an application for providing atmospheric pressure, humidity, temperature, etc.). Additionally or alternatively, the applications may include an application relating to information exchange between the HMD apparatus 100 and the electronic device 200. For example, the application relating to the information exchange may include a notification relay application for forwarding specific information to the electronic device 200, or a device management application for managing the electronic device 200.

For example, the notification relay application may include a function of transferring, to the electronic device 200, notification information generated from other applications of the HMD apparatus 100 (e.g., an SMS/MMS application, an e-mail application, a health management application, an environmental information application, etc.). Additionally or alternatively, the notification relay application may receive notification information from the electronic device 200 and provide the received information to the user. For example, the device management application may manage (e.g., install, delete, or update) a function for at least part of the electronic device 200 communicating with the HMD apparatus 100 (e.g., turning on/off the external electronic device itself (or some elements thereof) or adjusting the brightness (or resolution) of a display), applications operating in the external electronic device, or services provided by the external electronic device (e.g., a telephone call service or a message service).

FIG. 11 is a diagram for explaining a normal mode, and a head-mounted mode (HMM) or a VR mode of the HMD apparatus 100, according to various embodiments of the present disclosure.

In the HMM or VR mode, at least one of a see-through function for providing augmented reality (AR) and a see-closed function for providing virtual reality (VR) is provided through a display. For example, in cases where a smart phone, as the electronic device 200, operates while being mounted on the main frame 110 of the HMD apparatus 100 of the present disclosure, the HMD apparatus 100 may change from a normal mode to the HMM or VR mode. In the HMM or VR mode, one image may be displayed as two divided images. According to an embodiment, since an image may be distorted by the lens 240 included in the main frame 110 in the HMM or VR mode, a plane image may be inversely distorted according to the characteristic of the lens in order to provide an undistorted image to a user.

FIG. 12 is a diagram illustrating an example in which a head-mounted display apparatus provides a see-through mode using a rear camera of a smart phone, according to various embodiments of the present disclosure.

Referring to FIG. 12, the head-mounted display apparatus 100 of the present disclosure may provide a see-through mode using the rear camera of the smart phone as the external electronic device 200.

According to an embodiment, in a method of providing a see-through mode, the rear camera of the smart phone may be executed when a button for changing a VR mode to a see-through mode is pressed. In this case, a preview screen of the rear camera may be displayed in a picture-in-picture form on a partial area of an existing VR screen, or the VR screen may be converted into a background screen, and the preview screen of the rear camera may be expanded and displayed on the whole area. Accordingly, a user can experience an external virtual environment and at the same time, can identify the surrounding environment through the camera image as needed.

Figure 13:
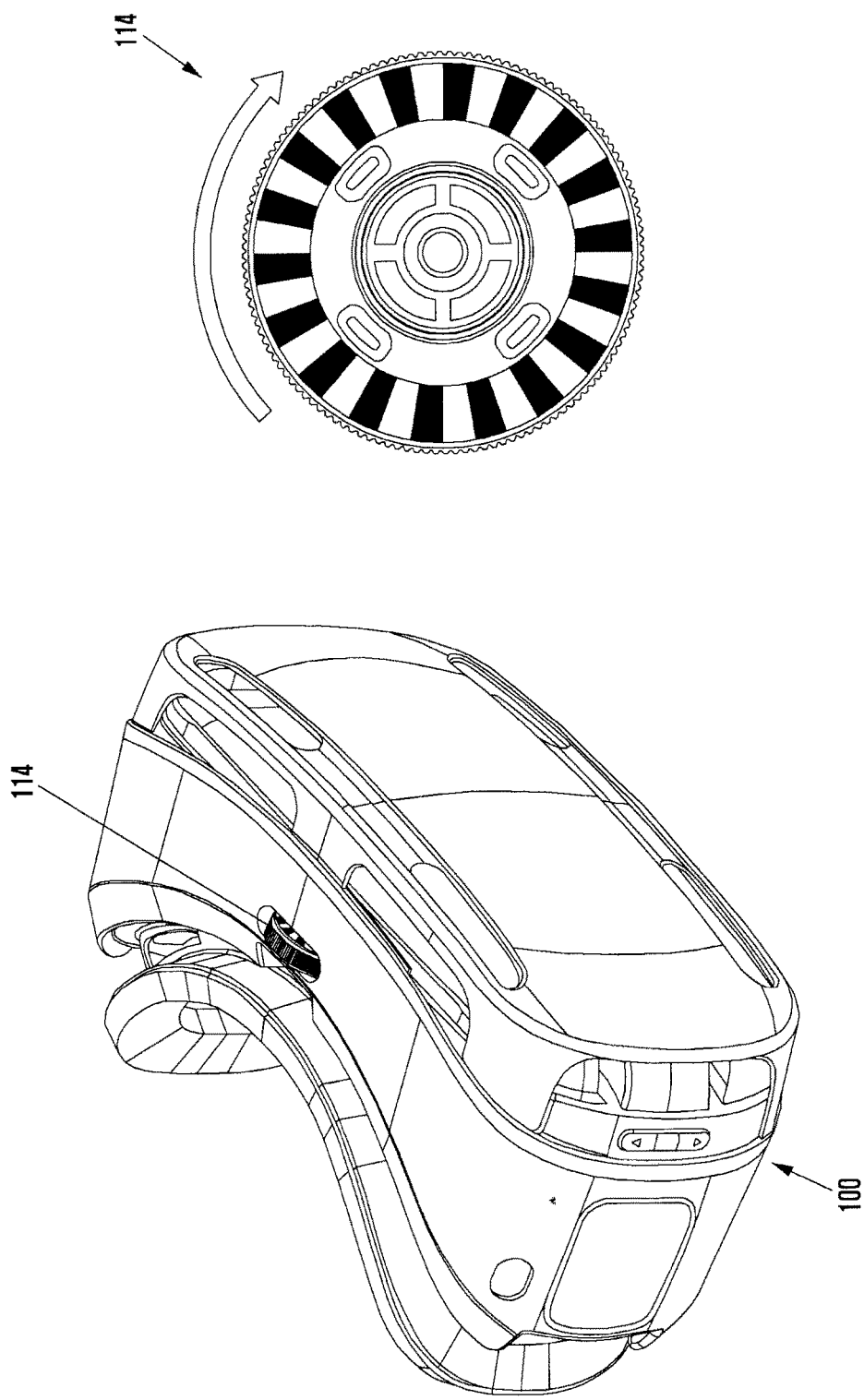
FIG. 13 illustrates a position adjustment part of the head-mounted display apparatus according to various embodiments of the present disclosure.

FIG. 13 illustrates a position adjustment part 114 of the head-mounted display apparatus 100 according to various embodiments of the present disclosure.

When the position adjustment part 114 located in the main frame 110 is operated, an external input may be received through a device for detecting the rotation or operation of the position adjustment part 114, such as the sensor module 360, the focus adjustment unit 440, a switch, etc. which are located in the interior of the main frame 110 or on the main frame 110. In the various embodiments of the present disclosure, an external input may be detected by a photo reflector sensor which is one of many devices for detecting the operation of the position adjustment part 114. The sensor module 360 for detecting rotation is located on at least one surface of the display position adjustment part 114 located in the main frame 110, and an arbitrary pattern may be applied to one surface of the display position adjustment part. The photo reflector sensor may detect rotation by sending out light of a light emitting part to one surface of the display position adjustment part 114 and then detecting a change in an input value of a light receiving part depending on a pattern change by the rotation.

Figure 14:
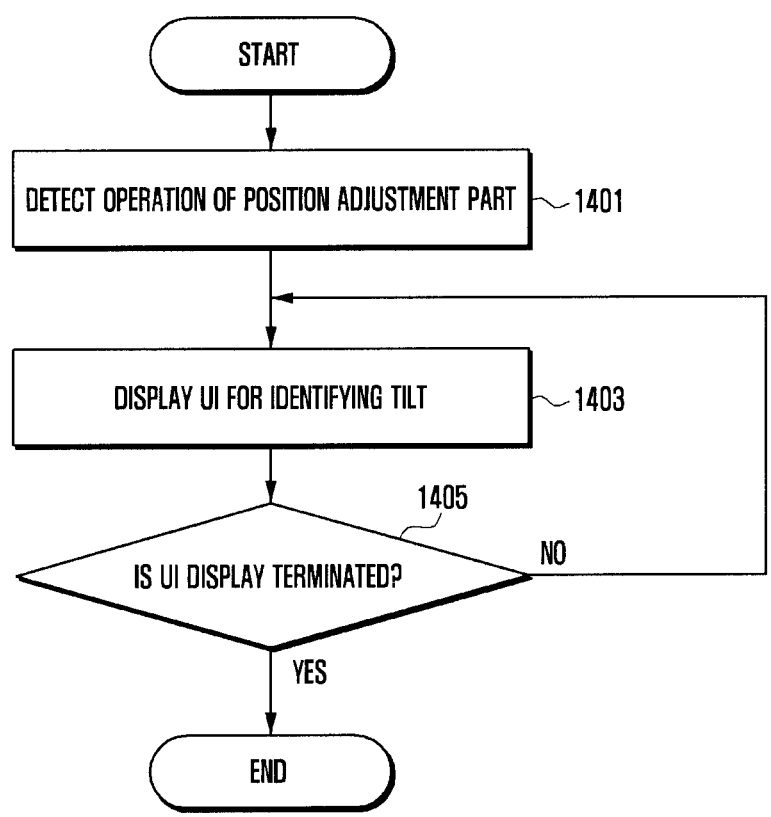
FIG. 14 is a flowchart illustrating an operation of detecting tilting of the head-mounted display apparatus 100 and displaying a user interface (UI) according to various embodiments of the present disclosure.

FIG. 14 is a flowchart illustrating an operation of detecting tilting of the head-mounted display apparatus 100 and displaying a user interface (UI), according to various embodiments of the present disclosure.

In operation 1401, the HMD apparatus 100 may detect an operation of the position adjustment part 114. In an embodiment, the HMD apparatus 100 may implement a predetermined pattern of the position adjustment part 114, and a photo reflector sensor may detect rotation by sending out light, emitted from a light emitting part, to one surface of the position adjustment part 114 and then detecting a change in an input value of a light receiving part depending on a pattern change by the rotation.

In operation 1403, the HMD apparatus 100 may display a user interface (UI) for identifying a tilt. In an embodiment, the HMD apparatus 100 may display the user interface (UI) for identifying a tilt on the electronic device 200 coupled thereto in operation 1403. The user interface (UI) for identifying a tilt may also serve as a user interface for identifying a focus. For example, the user interface (UI) for identifying a tilt may have a repeated pattern (e.g., one or more dot shapes in a lengthwise direction). If an image adjusted by a user through the position adjustment part 114 is in complete focus and is not tilted, the user interface (UI) for identifying a tilt, of which the image (e.g., all dots) is clear, may be displayed. If an image adjusted by the user through the position adjustment part 114 is out of focus and is tilted, the user interface (UI) for identifying a tilt, having a defocused portion or a peripheral portion more blurred than the central portion thereof, may be displayed.

The user may adjust the position adjustment part 114 through the user interface (UI) for identifying a tilt to adjust the focus of an image and remove the tilt thereof.

In operation 1405, the HMD apparatus 100 may determine whether to terminate the user interface (UI) for identifying a tilt. When the user interface (UI) for identifying a tilt is not to be terminated, the HMD apparatus 100 returns to operation 1403. Whether to terminate the user interface (UI) for identifying a tilt may be determined when a user input for terminating the user interface (UI) for identifying a tilt is received. The user input may be entered through at least one of the touchpad 112 on the side of the main frame 110, a physical key, a physical button, a touch key, a joystick, and a wheel key.

FIG. 15 illustrates examples of a screen for detecting tilting of the head-mounted display apparatus 100 and displaying a user interface (UI), according to various embodiments of the present disclosure.

When the lens 260 and the front case 122 are parallel or substantially parallel to each other as in the example of a screen designated by reference numeral 1501, all dots of a user interface (UI) for identifying a tilt may be clearly displayed as in the example of a screen designated by reference numeral 1503.

When the front case 122 is tilted with respect to the lens 260 as in the example of a screen designated by reference numeral 1505, some dots of the user interface (UI) for identifying a tilt may not be clearly displayed, but the dots may be blurredly displayed, or the peripheral shapes of the dots may be distorted as in the example of a screen designated by reference numeral 1507. In the user interface (UI) for identifying a tilt, which is displayed on the screen designated by reference numeral 1507, the dots in the outer area may be displayed in a defocused state, or the peripheral shapes thereof may be distorted due to the tilting of the front case, compared to the dots in the central area.

Figure 16:
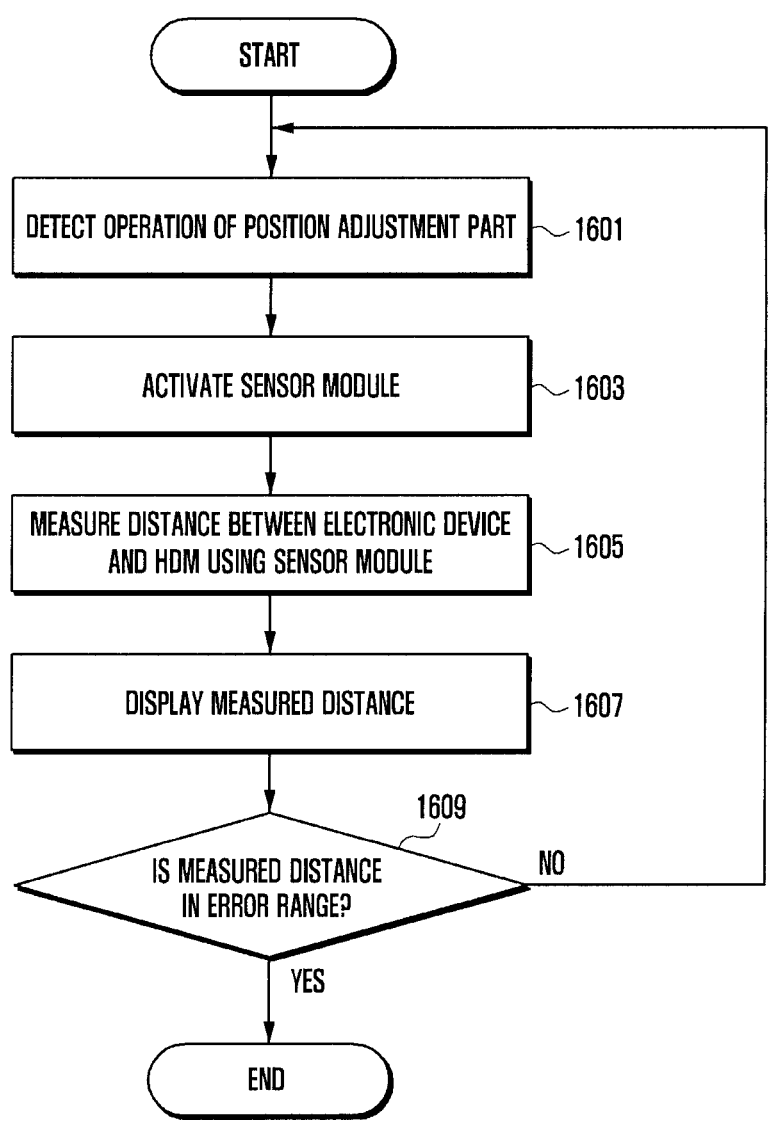
FIG. 16 is a flowchart illustrating an operation of detecting tilting of the head-mounted display apparatus and displaying a measured value according to various embodiments of the present disclosure.

FIG. 16 is a flowchart illustrating an operation of detecting tilting of the head-mounted display apparatus 100 and displaying a measured value, according to various embodiments of the present disclosure.

In operation 1601, the HMD apparatus 100 may detect an operation of the position adjustment part 114.

In operation 1603, the HMD apparatus 100 may activate the sensor module 360. The HMD apparatus 100 may activate a sensor capable of measuring a distance and a depth among the sensors of the sensor module 360 in operation 1603. The sensor capable of measuring a distance and a depth may be a proximity sensor, a camera, an ultrasonic sensor, etc.

In operation 1605, the HMD apparatus 100 may measure the distance between the electronic device 200 and the HMD apparatus 100 using the sensor module 360.

In operation 1607, the HMD apparatus 100 may display the measured distance. In an embodiment, the HMD apparatus 100 may display the measured distance through the electronic device 200 in operation 1607.

In operation 1609, the HMD apparatus 100 determines whether the measured distance is in an error range. For example, when the distance between the electronic device 200 and the HMD apparatus 100 is in the error range, it may be determined that tilting or defocusing has not occurred. In contrast, when it is determined that the measured distance is beyond the error range, a user may continue to make an attempt to adjust the focus or tilt using the position adjustment part 114, and the HMD apparatus 100 may return to operation 1601.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for".

The embodiments disclosed herein and shown in the drawings are provided merely to easily describe the technical details of the present disclosure and help understanding of the present disclosure, and are not intended to limit the scope of the present disclosure.

Therefore, in addition to the embodiments disclosed herein, the scope of the various embodiments of the present disclosure should be construed to include all modifications or modified forms drawn based on the technical idea of the various embodiments of the present disclosure.

What is claimed is:

1. A head-mounted display apparatus comprising:
   a main frame having a surface adapted to face a user's face; and
   a support part coupled to at least part of the main frame to fix the main frame to the user's face,
   wherein the main frame comprises:
      a front case adapted to receive an electronic device and a rear case adapted to enclose a lens fixing part, the lens fixing part adapted to integrally or detachably receive one or more lenses,
      one or more lens moving rail fixing parts disposed within an interior of the rear case,
      one or more lens moving rails corresponding to the one or more lens moving rail fixing parts, each lens moving rail having one end attached to the front case, and an other end adapted to be coupled to the corresponding lens moving rail fixing part,
      one or more resilient members corresponding to the one or more lens moving rails, each lens moving rail disposed within an interior of the corresponding resilient member,
      a position adjustment part that, when the position adjustment part is operated by the user, causes the front case to move along the one or more lens moving rails, so that a distance between the electronic device and the one or more lenses is changed,
      a sensor module configured to measure a distance between the electronic device and the head-mounted display apparatus and detect an operation of the position adjustment part,
      wherein a pattern is imprinted on a surface of the position adjustment part to allow for the sensor module to detect the operation of the position adjustment part.

2. The head-mounted display apparatus of claim 1, wherein the surface of the main frame facing the user's face has a curved-surface structure of a facial shape such that the user is able to wear the head-mounted display apparatus.

3. The head-mounted display apparatus of claim 1, wherein the main frame further comprises a cover coupled to the front case to support the electronic device.

4. The head-mounted display apparatus of claim 1, wherein the resilient members are at least one of coil springs, plate springs, hydraulic springs, rubbers, and sponges.

5. The head-mounted display apparatus of claim 1, wherein each lens moving rail fixing part includes a hook that supports the corresponding resilient member, and a recess adapted to receive the other end of the corresponding lens moving rails.

6. The head-mounted display apparatus of claim 5, wherein threads are formed on the other end of each lens moving rail, the threads are adapted to fixedly couple to corresponding threads in the recess of the corresponding lens moving rail fixing part.

7. The head-mounted display apparatus of claim 1, wherein the front case further comprises one or more coupling cylinders for coupling with the one or more lens moving rails, and wherein the one or more lens moving rails are disposed in an interior of the one or more coupling cylinders, and the one or more resilient members are disposed in an exterior of the one or more coupling cylinders.

8. The head-mounted display apparatus of claim 7, wherein the front case further comprises bushes that are disposed in the interior of the one or more coupling cylinders.

9. The head-mounted display apparatus of claim 1, wherein the main frame includes four lens moving rails and each lens moving rail is disposed at a different corner of the front case.

10. The head-mounted display apparatus of claim 1, further comprising:
    a touch panel on at least one side of the main frame, wherein the touch panel displays a graphical user interface (GUI) corresponding to a function of the electronic device and receives an input from the user, wherein the main frame further comprises a nose recess on the surface facing the user's face, and wherein the support part is one of a goggle band, an eyeglass temple, a helmet, and a strap.

11. The head-mounted display apparatus of claim 1, wherein the main frame further comprises:
    a memory;
    a communication module;
    a user input module adapted to receive a user input; and
    a controller configured to:
       display a graphical user interface (GUI) corresponding to a function of the electronic device on the user input module, and
       control the communication module to establish a communication connection with the electronic device and to transmit the user input to the electronic device.

12. The head-mounted display apparatus of claim 11, wherein the controller is further configured to receive the detected operation of the position adjustment part from the sensor module and to display a user interface for identifying a tilt of the electronic device.

13. The head-mounted display apparatus of claim 12, wherein the user interface for identifying the tilt provides a blurred or defocused image when the electronic device is tilted with respect to the head-mounted display apparatus and a focused or clear image when the electronic device is not tilted with respect to the head-mounted display apparatus.

14. The head-mounted display apparatus of claim 11, wherein the controller is further configured to: display the measured distance; and
   stop displaying the measured distance on the electronic device when the measured distance is in an error range.

\* \* \* \* \*